(12) United States Patent
Leblanc

(10) Patent No.: US 7,362,005 B2
(45) Date of Patent: Apr. 22, 2008

(54) ISOLATED DUAL BATTERY SYSTEM

(75) Inventor: Jean-Francois Leblanc, St-Nicéphore (CA)

(73) Assignee: Red Tech Inc., Drummondville (Qc) (CA)

( * ) Notice: Subject to any disclaimer, the term of this patent is extended or adjusted under 35 U.S.C. 154(b) by 415 days.

(21) Appl. No.: 11/075,656

(22) Filed: Mar. 10, 2005

(65) Prior Publication Data

US 2006/0201724 A1    Sep. 14, 2006

(51) Int. Cl.
*H01M 10/44* (2006.01)

(52) U.S. Cl. .................. 307/10.1; 307/23; 307/44; 307/18; 307/19; 307/20; 307/21; 320/103; 320/104; 320/116; 320/128; 320/132; 320/137; 320/138

(58) Field of Classification Search .......... 307/10.1, 307/23, 44, 18, 19, 20; 320/167, 117, 118, 320/103
See application file for complete search history.

(56) References Cited

U.S. PATENT DOCUMENTS

| | | | |
|---|---|---|---|
| 5,977,652 A | 11/1999 | Frey et al. | |
| 5,986,431 A | 11/1999 | Hayes | |
| 6,222,341 B1 | 4/2001 | Dougherty et al. | |
| 6,229,279 B1 | 5/2001 | Dierker | |
| 6,232,674 B1 | 5/2001 | Frey et al. | |
| 6,304,054 B1 | 10/2001 | Granberg et al. | |
| 6,452,361 B2 | 9/2002 | Dougherty et al. | |
| 6,597,149 B1 | 7/2003 | Urlass | |
| 6,645,675 B1 * | 11/2003 | Munshi | 429/305 |
| 6,731,021 B1 | 5/2004 | Urlass | |
| 6,737,832 B2 * | 5/2004 | Uchida | 320/138 |
| 6,765,312 B1 * | 7/2004 | Urlass et al. | 307/10.1 |
| 6,967,463 B1 * | 11/2005 | Gordon et al. | 320/103 |
| 7,157,884 B2 * | 1/2007 | Hacsi | 320/167 |

* cited by examiner

*Primary Examiner*—Christopher P. Ellis
*Assistant Examiner*—Cynthia F. Collado
(74) *Attorney, Agent, or Firm*—Equinox Protection; Franz Bonsang, Patent Agent

(57) ABSTRACT

An isolated dual power source system for isolating a first power source of a vehicle, connected to an engine starter, from a second power source of the vehicle which has an electrical circuit for distributing electrical power among the consumers, includes first and second switches for selectively connecting the first and second power sources to the electrical circuit, respectively. The system may include a controller that independently and operatively connects to the first and second switches to control operation thereof for selective and respective isolation from the electrical circuit. A third switch connecting the second power source to the starter may be used to selectively provide power thereto and bypass the first power source to start the engine.

28 Claims, 3 Drawing Sheets

ISOLATED DUAL BATTERY SYSTEM

FIELD OF THE INVENTION

The present invention relates to battery controlled systems and methods and is more particularly concerned with protection and management of the power supply of the system.

BACKGROUND OF THE INVENTION

It is well known in the art to use a control system to manage the limited power sources such as in trailer trucks for example. A standard power supply circuitry is currently commonly used but still suffers of inconvenient and potential drawbacks for the user. Alternator failure and starter motor failure are just examples that can be caused by an inappropriate use or control of the numerous accessories or power consumers necessary nowadays whilst operating and spending numerous hours in such trailer trucks. Accessories related to lighting, heating, communication equipment, food preparation, entertainment, etc. increased in number over the years and need to be monitored efficiently to avoid overloading the battery system that could cause failure of the batteries themselves.

Unlike most automobiles, commercial tractor/trailer vehicles typically utilize large diesel engines requiring substantial amounts of short-term power (e.g. about 1800 amperes) to start the engine. Such large current demands result from, among other things, the requirements of the fuel injection systems of such engines. In order to satisfy the large current demands of the diesel engines, commercial tractor/trailer vehicles are typically equipped with battery power systems including a plurality of high cold-cranking-ampere (CCA) batteries connected in parallel.

Supplying high cold-cranking current is not the only requirement for battery power systems used in commercial tractor/trailer vehicles. Such systems must also provide electrical power during times when the engine is not running. Of course, while the engine is running, ample electrical energy is usually provided by the alternator to operate such electrical devices as communication equipment, radios, lights, and other creature-comfort devices including microwave ovens, electric blankets, televisions, video tape recorders, etc. However, when the engine is not running, if any electrical devices are to be powered, they must be powered by the battery power system or an alternative system.

In earlier battery power systems, 12-volt batteries were utilized to both start the engine and run any electrical appliances when the engine was not running. Such systems experienced very significant problems, in that the electrical appliances would run the batteries down to the point that they would be unable to start the engine when required. This often occurred if the electrical appliances were run for a long period of time. In order to prevent this situation from occurring, systems were developed to isolate some batteries from the electrical appliances during times when the engine is not running. Those batteries would then be able to start the engine.

Presently, a so-called "3+1" battery power system is used to start the engine and power some electrical accessories when the engine is off. This system uses four pack 12-volt batteries which are typically enclosed in a battery box. Pack refers to the size and shape of the battery which is the industry standard for commercial tractor/trailers. To guarantee sufficient cold-cranking current, three of the pack 12-volt batteries are connected in parallel and used for starting the engine and for providing power at every critical electrical circuit such as computer, ignition circuit, etc. The remaining battery (the "+1" battery) is used exclusively for the key-off operation of some electrical accessories such as interior and exterior lights, heater, inverter, etc. When the engine is off, the accessory battery is isolated from the starting batteries. After the engine is started, the accessory battery is switched in parallel with the starting batteries so that it can be charged by the engine's alternator.

Although isolation power systems such as the 3+1 battery power system does not always ensure sufficient starting power by preserving the charge on the starting batteries, such systems work at the expense of providing power for electrical accessories while the engine is off. As a result, several alternatives have emerged to deal the limitations of these battery power systems. For example, a small minority of tractor/trailers are equipped with small diesel-powered generators to supply electrical energy to the appliances while the main diesel engine is off.

Where the tractor/trailer is not equipped with such generators as is the usual case, the drivers may elect to run the engine while they are resting or may choose to run the accessory battery down until it completely runs out of energy. Since running the engine is very expensive and potentially dangerous, many drivers choose to completely drain the accessory battery. Due to such repeated over-discharging, the accessory battery in a 3+1 battery power system cannot be fully recharged in many instances during normal operation of the vehicle. This causes a significant reduction of service life of the accessory battery. In fact, it is quite common for accessory batteries to need replacement every two or three months.

The fundamental problems are associated with 3+1 battery power systems: first, they fail to provide key-off power for an adequate amount of time such that durability of the battery is very poor. For example, during cold winter nights, a driver may depend on an electrical blanket to keep warm. If the driver decides to let the accessory battery run until it is low in energy, this will generally occur well before he or she is ready to drive again. Typically, the driver is going to let the electrical blanket run and the battery power level will get very low, close to a completely discharged state. Typically, the accessory battery is at a low state of charge when asked to provide power, which significantly reduces the time the driver may use the blanket. In such a case, the electrical blanket will cease to work during the night. This is obviously unacceptable. Second, 3+1 battery power systems can't ensure that the engine will always start. For example, the driver just needs to forget the ignition on, typically along with the computer, for the electrical consumer to completely drain down the batteries such that the truck/trailer won't start.

Numerous US patents relate to the isolation of the starter batteries from the rest of the vehicle electrical circuit such that they remain at an appropriate charge level to ensure proper starting of the engine whenever required. With such an isolation system, using an electronic controller coupled to high power relays, the starter batteries are prevented from being drained out or discharged by the different power consumers being turned on, especially when the engine is standby or not running and preserve their charge. Examples of such US patents are:

U.S. Pat. No. 6,765,312 granted to Urlass et al. on Jul. 20, 2004 entitled: "Dual Battery System";

U.S. Pat. No. 6,731,021 granted to Urlass on May 4, 2004 entitled: "Two-Battery System";

U.S. Pat. No. 6,597,149 granted to Urlass et al. on Jul. 22, 2003 entitled: "Battery System";

U.S. Pat. No. 6,452,361 granted to Dougherty et al. on Sep. 17, 2002 entitled: "Battery System";

U.S. Pat. No. 6,304,054 granted to Granberg et al. on Oct. 16, 2001 entitled: "Electrical System for Motor Vehicles";

U.S. Pat. No. 6,232,674 granted to Frey at al. on May 15, 2001 entitled: "Control Device for a Vehicle Electric System";

U.S. Pat. No. 6,229,279 granted to Dierker on May 8, 2001 entitled: "Dual Battery System";

U.S. Pat. No. 6,222,341 granted to Dougherty et al. on Apr. 24, 2001 entitled: "Dual Battery Charge Maintenance System and Method";

U.S. Pat. No. 5,986,431 granted to Hayes on Nov. 16, 1999 entitled: "Battery Power System for Vehicles"; and U.S. Pat. No. 5,977,652 granted to Frey et al. on Nov. 2, 1999 entitled: "Device for Supplying Voltage in a Motor Vehicle Including Two Batteries and Having Improved Reliability".

In all of the above patents, the so-called vehicle electrical system battery, although isolated from the starter battery, is permanently connected to the vehicle electrical system. This permanent connection is not trouble free and could be the cause of the lost of all power batteries of a vehicle.

In fact, if such a vehicle electrical system battery becomes ever occurs to dry out or short for some reasons, it will draw most of the power generated by the alternator and will ultimately discharge the starter battery that would have been connected to the vehicle electrical system to assist the alternator and supply power to the consumers down to a level insufficient for ultimately restart the engine. In such a case, the driver of the tractor/trailer vehicle will end up being stuck without enough power to start the engine and drive to the closest location for costly repair and/or replacement of defect parts, after spending extensive time and money for towing.

Accordingly, there is a need for an improved isolated dual power source system for vehicle, with a relatively simple configuration.

SUMMARY OF THE INVENTION

It is therefore a general object of the present invention to provide an improved isolated dual power source system and method for vehicle and the like.

An advantage of the present invention is that the isolated dual power source system provides for an electrical system essentially free of major shutdown because of failure of the two battery power sources.

Another advantage of the present invention is that the isolated dual power source system ensures that at least one of the two battery power sources always remains sufficiently charged to allow restart of the engine, even upon major failure of the other battery power source.

Still another advantage of the present invention is that the isolated dual power source system allows the use of the different types of batteries based on their applications, such as high cold cranking ampere batteries for the first power source to start the engine and a low or deep cycle batteries for the second power source to power the different vehicle consumers, including a starter, through an electrical distribution circuit. The life of each type of battery will be then increased since, for example, the second power source is protected against deep discharging that could reduce life cycle thereof.

A further advantage of the present invention is that the isolated dual power source system keeps the starter battery isolated from the vehicle electrical system except temporarily for recharging the same when the engine is running.

Yet another advantage of the present invention is that the isolated dual power source system features a wiring conception which ensures that when the truck/trailer is running, the two relays could be kept closed such that if one of the two relays malfunctions, the other will ensure proper voltage to the electronic consumers so the truck will continue to operate, thereby increasing the security of the truck/trailer.

Still another advantage of the present invention is that the isolated dual power source system keeps the vehicle electrical system battery generally permanently connected to the vehicle electrical system, and warns the user when it reaches a low power level before disconnecting it to prevent it from reaching a completely discharged state.

Another advantage of the present invention is that the isolated dual power source system relies on an engine oil pressure sensor to determine whether the engine is running or not.

Still a further advantage of the present invention is that the isolated dual power source system is relatively easily installed or integrated into an existing vehicle, without having to modify the supply of the vehicle electronic circuits for selective powering of consumers.

Yet another advantage of the present invention is that the isolated dual power source system keeps the driver inform of the malfunction of any piece of equipment, including its battery isolating switches or high power relays for fix as soon as possible to avoid more serious problem that could eventually occur.

Still a further advantage of the present invention is that the isolated dual power source system may include a plurality of different sensors with some being connected to the vehicle equipment to provide the driver with different warnings, them being audible and/or visible.

Another advantage of the present invention is that the isolated dual power source system can be programmable to the needs of the user and also be easily adapted to the type of vehicle it is used with.

A further advantage of the present invention is that the isolated dual power source system can include a third high power relay connecting the vehicle electrical system battery to the starter to eventually bypass the starter battery to start the engine in case of failure of the starter battery.

According to a first aspect of the present invention, there is provided an isolated dual power source system for isolating a first power source of a vehicle, connected to a starting power consumer for starting an engine of the vehicle, from a second power source of the vehicle, the vehicle having consumers, including an electrical power generating means and an electrical circuit for distributing electrical power among the consumers, said system comprises: a first switch for selectively connecting the first power source to the electrical circuit to provide power thereto when said first switch is closed; and a second switch for selectively connecting the second power source to the electrical circuit to provide power thereto when said second switch is closed.

In one embodiment, the system further includes an electronic controller independently and operatively connecting to said first and second switches, whereby said electronic controller independently controls operation of both said first and second switches to selectively isolate respective said first and second power sources from the electrical circuit.

Typically, the system includes a first power source sensor for measuring a first level of available electrical power from said first power source and a second power source sensor for measuring a second level of available electrical power from said second power source, said first and second power source sensors electrically connecting to said electronic controller, to which said first power level and said second power level are transmitted, and, respectively, to said first and second power sources.

Conveniently, the electronic controller generates a warning for a user when said first power level is below a first predetermined power level required to provide sufficient electrical power to said starting power consumer for starting the engine. Similarly, the electronic controller generates a warning for a user when said second power level is below a second predetermined power level required to provide sufficient electrical power to the consumers, including the electrical power generating means and the electrical circuit.

Typically, the system includes an engine sensor connecting to the engine and electrically connecting to said electronic controller for detecting when the engine is running. Preferably, the engine sensor is an oil pressure sensor for detecting a pressure level of engine oil, said pressure level being larger than a predetermined pressure level when the engine is running.

In one embodiment, the electronic controller closes said first switch when the engine is running and said first power level is below a third predetermined power level required to indicate said first power source is at full electrical capacity, thereby allowing the electrical power generating means to recharge said first power source.

Typically, the electronic controller opens said first switch when said first power level is larger or equal than said third predetermined power level, thereby indicating said first power source has been recharged at full electrical capacity.

In one embodiment, the electronic controller ensures that said first switch is opened when the engine is being turned off.

In one embodiment, the electronic controller generates a warning for a user and opens said second switch when the engine is running and said second power level remains below said second predetermined power level after being recharged by the electrical power generating means for a first predetermined amount of time, thereby indicating that the second power source needs to be replaced.

Conveniently, when said engine is not running and said second power level is below the second predetermined power level, said electronic controller generates a warning for a user to start the engine to allow recharge of the second power source. Typically, the electronic controller subsequently opens said second switch to disconnect the second power source from the electrical circuit until the engine is restarted.

In one embodiment, the system further includes at least one sensor for sensing information about at least one of the vehicle and consumers thereof and a display connected to said electronic controller for visually displaying information collected by said at least one sensor.

Typically, the system includes a container for housing said electronic controller, said container being locatable in an interior area of the vehicle adjacent a driver seat thereof.

Typically, the electronic controller is programmable by a user.

Conveniently, the electronic controller includes a memory for selectively storing at least one of said first and second predetermined power levels therein.

In one embodiment, the system further includes a third switch for selectively connecting the second power source to the starting power consumer to provide power thereto when said third switch is closed, whereby the third switch allows the second power source to bypass the first power source so as to allow starting of the engine therewith.

Conveniently, an electronic controller independently and operatively connects to said first, second and third switches, whereby said electronic controller independently controls operation of both said first and second switches to selectively isolate respective said first and second power sources from the electrical circuit and operation of said third switch to selectively connect said second power source from said starting power consumer.

Typically, the system includes a first power source sensor for measuring a first level of available electrical power from said first power source and a second power source sensor for measuring a second level of available electrical power from said second power source, said first and second power source sensors electrically connecting to said electronic controller, to which said first power level and said second power level are transmitted, and, respectively, to said first and second power sources.

Typically, before the engine is started, said electronic controller closes said third switch to allow said second power source to power said starting power consumer to allow starting the engine when said first power level is below a first predetermined power level required to provide sufficient electrical power to said starting power consumer for starting the engine.

Typically, the first, second and third switches are generally opened, closed and opened, respectively, during normal operation of the vehicle.

In a second aspect of the present invention, there is provided a method for isolating a first power source of a vehicle, connected to a starting power consumer for starting an engine of the vehicle, from a second power source of the vehicle, the vehicle having consumers, including an electrical power generating means and an electrical circuit for distributing electrical power among the consumers, said method comprises: connecting said first power source to the electrical circuit through a first switch; and connecting said second power source to the electrical circuit through a second switch; thereby allowing selective isolation of said first and second power sources from the electrical circuit through independent operative control of said first and second switches, respectively.

In one embodiment, the method further includes: connecting said second power source to the starting power consumer through a third switch; thereby allowing the second power source to bypass the first power source so as to allow starting of the engine therewith when the first power source is below a predetermined power level required to provide sufficient electrical power to said starting power consumer for starting the engine.

Typically, the vehicle includes an electronic controller, said method further includes: connecting said first, second and third switches to the electronic controller for selective and independent control thereof by the controller.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE PREFERRED EMBODIMENTS

With reference to the annexed drawings the preferred embodiments of the present invention will be herein described for indicative purpose and by no means as of limitation.

It is noted that the terms battery, batteries, battery power source, and power source used throughout the following description refer to one or a group of batteries connected in parallel to supply power to consumers connected thereto. It could eventually be a generator, another engine, etc. depending on the configuration of the system.

Figure 1:
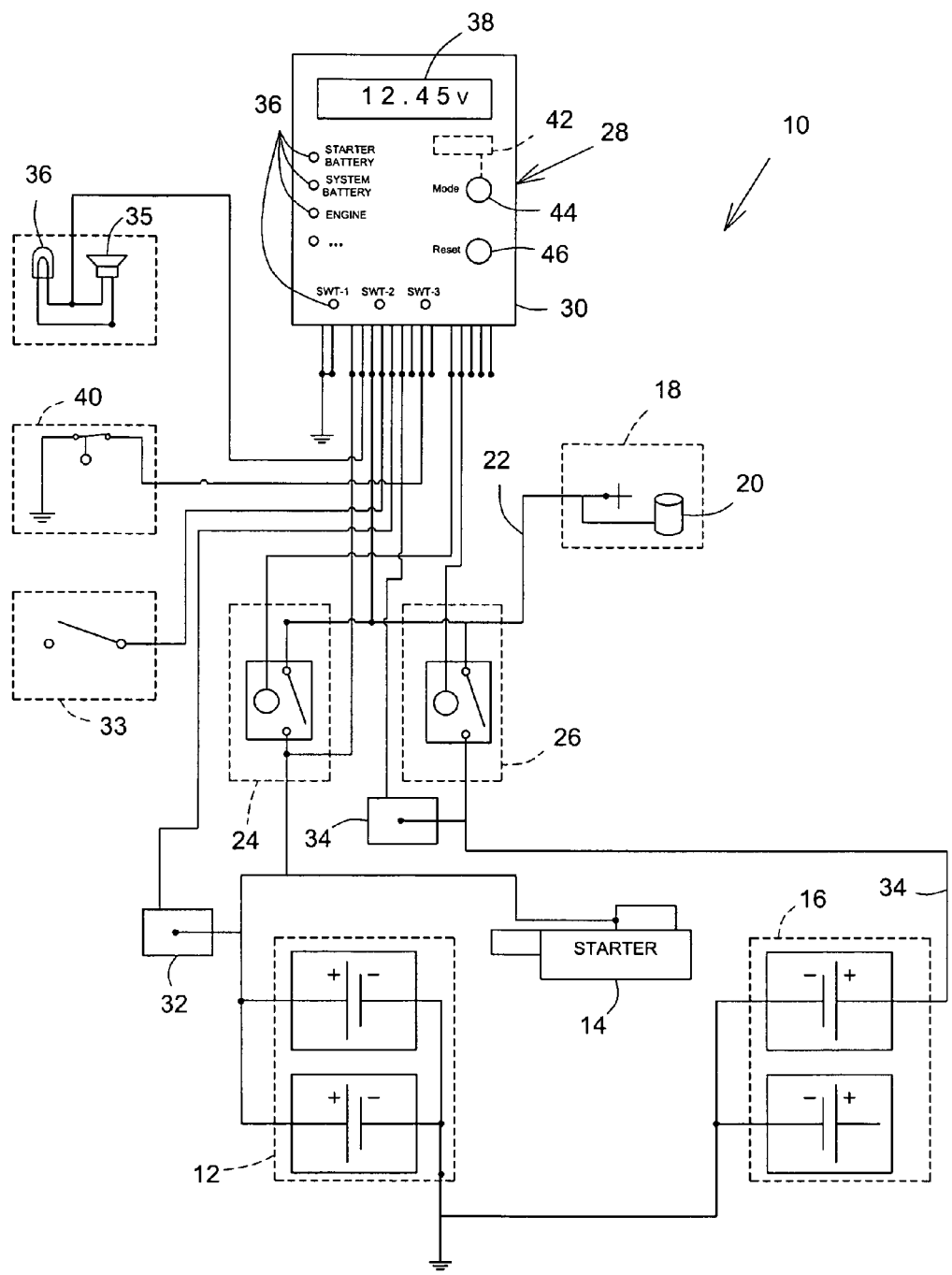
FIG. 1 is a schematic diagram—6—of an isolated dual power source system in accordance with an embodiment of the present invention for protecting and increase the reliability and the overall service life of the vehicle electrical system.

Referring to FIG. 1, there is schematically shown an isolated dual power source system 10 in accordance with an embodiment of the present invention. The system 10 is for isolating a first power source 12 or starter battery of a vehicle (not shown) such as a tractor/trailer, truck or the like, connected to a starting and intermittent power consumer 14 or starter for starting an engine (not shown) of the vehicle, from a second power source 16 or vehicle electrical system battery. The vehicle typically has conventional and optional power consumers 18 or electrical equipment or the like, including an electrical power generating means 20 or alternator and an electrical circuit 22 for distributing electrical power among the consumers 18.

Although not illustrated therein, the starter battery 12 could also eventually be connected to other starting-related intermittent consumers or on-board equipments that may require power only when the engine is to be started.

As more specifically shown in FIG. 1, the system 10 includes a first switch 24 or starter high power relay to selectively connect the starter battery 12 to the electrical circuit 22 to provide power thereto when the first relay 24 is closed; and a second switch 26 or system high power relay to selectively connect the system battery 16 to the electrical circuit 22 to provide power thereto when the second relay 26 is closed.

The system 10 preferably includes an electronic controller 28, typically housed within a container 30 that is locatable in an interior area or driver cabin (not shown) of the vehicle adjacent a driver seat thereof (not shown), that independently and operatively connects to the starter and system relays 24, 26 such that the electronic controller 28 independently controls operation of both starter and system relays 24, 26 to selectively isolate respective starter and system batteries 12, 16 from the electrical circuit 22, whenever required. Although the present description will always refer to the controller 28 operating the starter and system relays 24, 26, it would be obvious to one having ordinary skill in the art that the switches 24, 26 of the system 10 could be directly operated by the vehicle driver for safe, efficient, and reliable operation of the vehicle with no controller 28 without departing from the scope of the present invention.

All switches 24, 26, although being preferably high power relays, could be any type of switch known in the art that can be connected to high power batteries or the like and handle relatively high current loads, there being directly activated by a user or via an electronic controller or the like.

During normal operation of the vehicle, the starter and system relays 24, 26 are generally respectively opened and closed to isolate the starter battery 12 from the vehicle electrical circuit 22, including other power sources, and to ensure availability of electrical power to the electrical circuit 22, even when the engine is not running, respectively.

In order for the controller 28 to control operation of the starter and system relays 24, 26 according to the overall real time status of the vehicle electrical system and circuit 22, including functioning of the engine, the system 10 typically further includes a first power source sensor 32, such as a voltmeter or the like, for measuring a first level of available electrical power from the starter battery 12 and a similar second power source sensor 34 for measuring a second level of available electrical power from the system battery 16. The first and second power sensors 32, 34 are electrically connected to the electronic controller 28, to which the first and second power levels are transmitted, and, respectively, to the starter and system batteries 12, 16.

Although optional, the electronic controller 28 typically generates a warning for a user when the first power level is below a first predetermined power or charge level required to provide sufficient electrical power to starter 14 for starting the engine. Similarly, the electronic controller 28 generates a warning for the user when the second power level is below a second predetermined power or charge level required to provide sufficient electrical power to the different consumers 18 hooked on the electrical circuit 22, including the controller 28 itself. Such warnings are audible warnings from a speaker 35 or the like connected to the controller 28 and/or visual warnings such as through typically color coded LEDs (Light Emitting Diodes) 36 or the like mounted on the container 30 or through the visual alpha-numerical display 38 thereof. By getting such warnings, the driver is made aware of the low power level condition of either battery 12, 16 and needs to start the engine to allow recharge thereof, if it is not already running in which case it would means that there is a malfunction of the corresponding battery 12, 16 and/or of the alternator 20.

Typically, the system 10 further includes an engine sensor 40 or the like connecting to the engine and electrically connected to the electronic controller 28 for the detection of the operation of the engine and transmission of the engine operational information to the controller 28. Preferably, the engine sensor 40 is an oil pressure sensor that detects or measures a pressure level of engine oil; the pressure level being larger than a predetermined pressure level when the engine is running.

During normal operation of the vehicle when the engine is running (as detected by the pressure sensor 40) and the first power level is below a third predetermined power level required to indicate the starter battery 12 is at full electrical charge capacity, the system controller 28 temporarily closes the starter relay 24 to allow the alternator 20 to recharge the starter battery 12 until the first power level is larger or equal to the third predetermined power level, at which time the starter relays is switched back into the open position thereby ensuring a safe restart of the engine whenever required. Obviously the third predetermined power level is larger than the first predetermined power level. Alternatively, the controller 28 could leave the starter relay 24 closed as long as the engine is running in order to ensure proper voltage to the electronic consumers 18 in the event one of the two relays 24, 26 would malfunction such that the truck continues to operate, thereby increasing the security of the truck/trailer. Accordingly, and for safe restart of the vehicle, the controller 28 ensures that the starter relay 24 is opened when the engine is being turned off.

Obviously, as it is done in existing vehicle electrical system when the engine is running, the system battery 16 is also being regularly recharged by the alternator 20 to maintain it at a power level substantially equal to the third predetermined power level. If, especially when the engine is running, the second power level remains below the second predetermined power level for first predetermined amount of time such as in the order of about two minutes or the like and does not recharge above that second predetermined power level, thereby indicating that the system battery 16 is malfunctioning and most likely needs to be replaced, the controller 28 opens the system relay 26 and closes the starter relay 24 to isolate the malfunctioning system battery 16 from the electrical system 22 and temporarily supply power to the electrical circuit 22 from the starter battery 12, if required, with corresponding optional warning being transmitted to the driver. In such a case, the isolation of the system battery 16 from the electrical system 22 prevents any possible damaging of the starter battery 12 by power drainage or electrical shortage that could be caused by the malfunctioning system battery 16 or simply a complete discharge of the system battery 16 that could therefore be saved instead of having to replace it.

The above situation usually occurs when the engine is not running, over night or the like, while some power consumers 18 are turned on. In such a case, the electronic controller 28 typically generates a warning for a user to start the engine to allow recharge of the system battery 16 to prevent further damage thereof. Furthermore, the electronic controller 28 subsequently opens the system relay 26 to disconnect the system battery 16 from the electrical circuit 22 until the engine is restarted.

Typically, the system 10 includes different types of sensors/detectors connected to the controller 28 and, when applicable, to respective vehicle equipments and/or consumers 18 to transmit information collected therewith to the driver. Such equipments are for examples, but by no means limited to, an overpass detector 33 (distance), thermal blanket, seat heater, communication equipment, small food-related appliances, etc.

Preferably, the electronic controller 28 is programmable by a user in order to set and/or customize the system 10 with some parameters. The parameters, such as first, second and third predetermined power levels and pressure predetermined level, are typically stored in a RAM (Read Access Memory) memory 42 included within the controller 28. The user could also selectively activate and/or deactivate different controller warnings (audible and/or visible) to customize his/her system 10, through different user input keys/buttons such as a 'MODE' button 44 and the like. The user may also decide to reset the controller 28 using a 'RESET' button 46 provided therefore.

Figure 2:
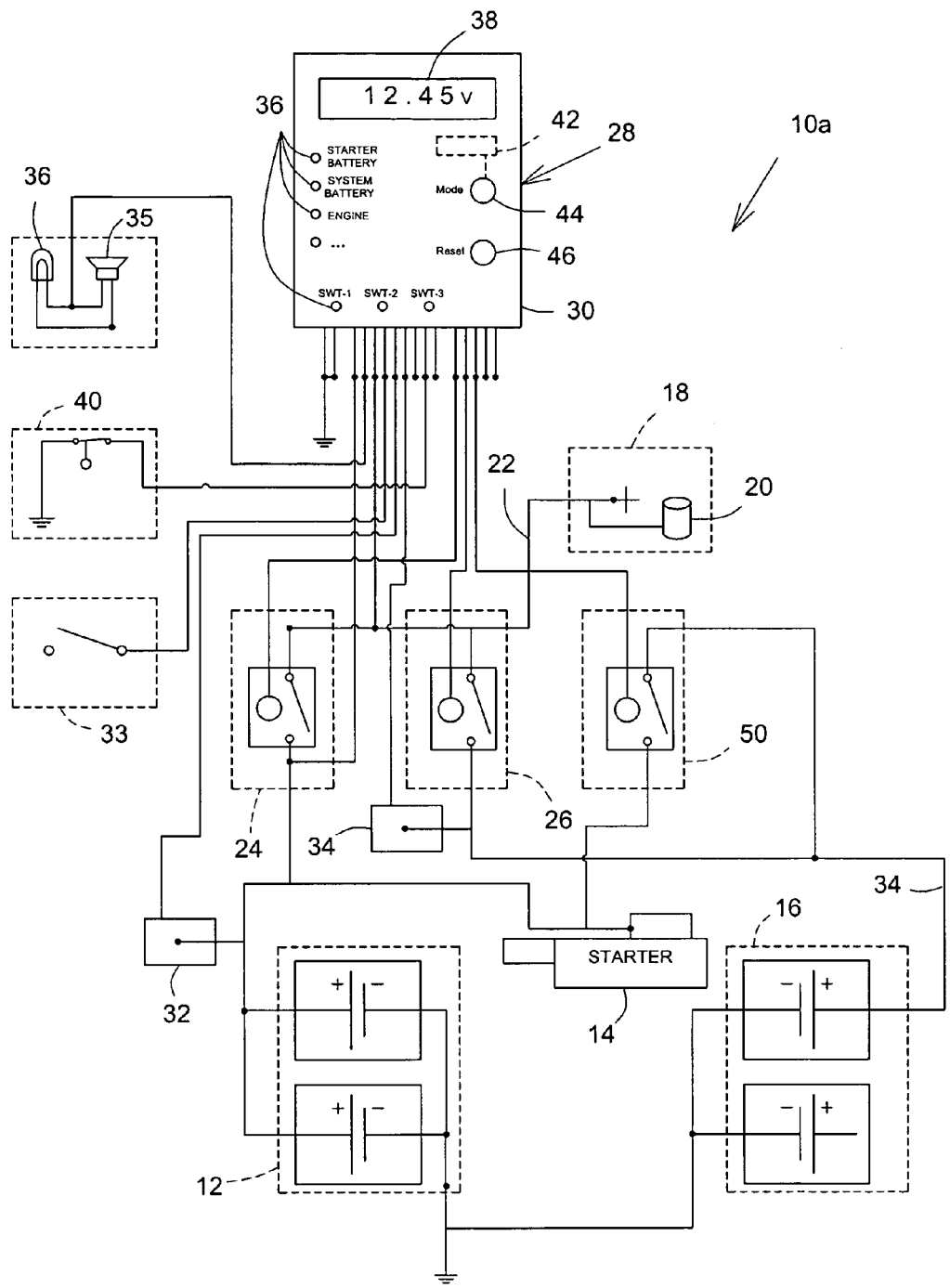
FIG. 2 is a schematic diagram—7new—of an isolated dual power source system in accordance with another embodiment of the present invention.

Furthermore, as illustrated in FIG. 2, the system 10*a* may include a third switch 50 or bypass starter high power relay to selectively connect the system battery 16 to the starter 14 to provide power thereto when the bypass relay 50 is closed such that the system 10*a* allows, through the bypass relay 50, the system battery 16 to bypass the starter battery 12 to enable starting of the engine therewith; the bypass relay 50 being activatable by either a vehicle driver or the controller 28, as detailed hereinbelow.

Consequently, the bypass relay 50 connects to the starter 14 and the system battery 16. The controller 28 independently and operatively connects to the bypass relay 50 such that the electronic controller 28 independently controls operation thereof to selectively connect (or isolate) the system battery 16 from the starter 14.

Accordingly, before starting the vehicle engine, whenever the controller 28 detects that the power charge level of the starter battery 12 is below the first predetermined power level for whatever reason, it temporarily closes the bypass relay 50 to allow the system battery 16 to power the starter 14 and start the engine. Then, as soon as the engine is running, the controller typically turns the bypass relay 50 back into the opened state, and then closes the starter relay 24 to ultimately enable recharging of the starter battery 12. Typically, the driver is made aware of the low charge level of the starter battery 12 by corresponding warning from the controller 28 until the power charge level of the starter battery 12 reaches a power level at least equal or larger than the first predetermined power level.

Obviously, the bypass relay 50 is generally opened during normal operation of the vehicle.

The LEDs 38 of the controller 28 could also be used to indicate the power charge level of the batteries 12, 16, using color coding, as well as the state status of the different switches 24, 26, 50 or relays.

Figure 3:
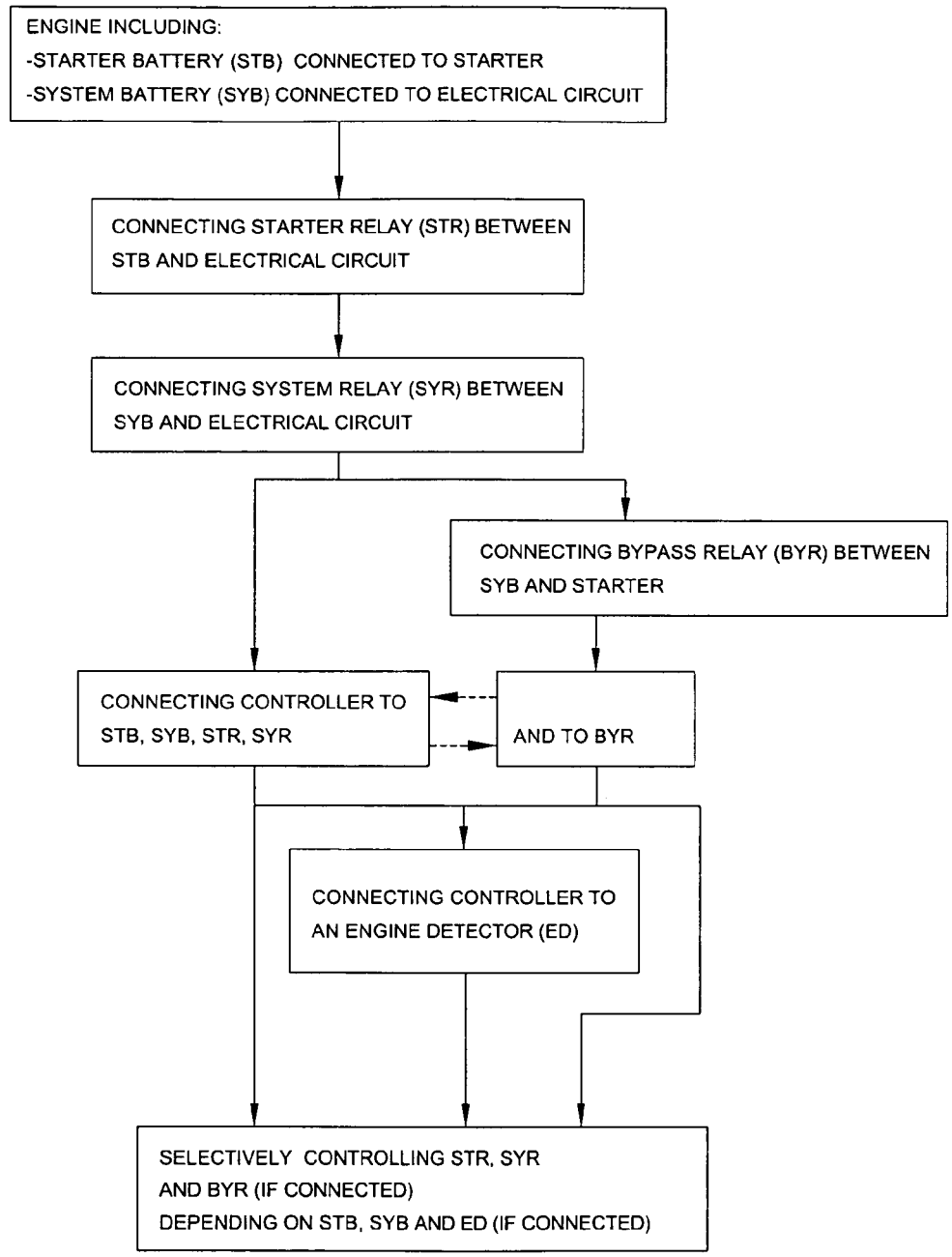
FIG. 3 is a schematic flow diagram showing the isolation steps of the two battery power sources of the embodiments of FIGS. 1 and 2 to ensure proper functioning of the vehicle electrical system in different extreme operating conditions.

Referring now more specifically to FIG. 3, the present invention also refer to a method for isolating a first power source 12 or starter battery, connected to a starting power consumer 14 or starter, for starting an engine of the vehicle, from a second power source 16 or system battery of the vehicle. The method includes:

connecting the first battery 12 to the electrical circuit 22 through a first switch 24 or starter high power relay; and connecting the system battery 16 to the electrical circuit 22 through a second switch 26 or system high power relay; thereby allowing selective isolation of the starter and system batteries 12, 16 from the electrical circuit 22 through independent operative control of the starter and system relays 24, 26, respectively.

Typically, the method further includes connecting the system battery 16 to the starter 14 through a third switch 50 or bypass starter high power relay; thereby allowing the system battery 16 to bypass the starter battery 12 so as to allow starting of the engine therewith when the starter battery 12 is below a first predetermined power level required to provide sufficient electrical power the starter for starting the engine such that it needs to be recharged and/or replaced.

The method further includes connecting the starter relay 24, the system relay 26 and the bypass relay 50, whenever present, to the electronic controller 28 for selective and independent control thereof by the controller 28.

Alternatives

Although not specifically described hereinabove, it would be obvious to one having ordinary skills in the art that a single power source sensor could be used to be selectively connected to the different power sources of the system (instead of having dedicated power source sensors) without departing from the scope of the present invention.

Furthermore, it would be obvious to one having skills in the art that the controller 28 could simply be a computer code entered within an existing vehicle computer without departing from the scope of the present invention.

The present invention could also be used in other types of applications, other than motor vehicles, having at least two independent power sources that may required to be isolated to improve the overall reliability of the system by preventing critical circumstances in which all power systems could be simultaneously 'killed' or be drained out from occurring; such as in an isolated building having two power generators or the like.

Although the present isolated dual power source system and method has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. An isolated dual power source system for isolating a first power source of a vehicle, connected to a starting power consumer for starting an engine of the vehicle, from a second power source of the vehicle, the vehicle having consumers, including an electrical power generating means and an electrical circuit for distributing electrical power among the consumers, said system comprising:
   a first switch for selectively connecting the first power source to the electrical circuit to provide power thereto when said first switch is closed; and
   a second switch for selectively connecting the second power source to the electrical circuit to provide power thereto when said second switch is closed.

2. The system of claim 1, further including an electronic controller independently and operatively connecting to said first and second switches, whereby said electronic controller independently controls operation of both said first and second switches to selectively isolate respective said first and second power sources from the electrical circuit.

3. The system of claim 2, further including a power source sensor for measuring a first level of available electrical power from said first power source and a second level of available electrical power from said second power source, said power source sensor electrically connecting to said electronic controller, to which said first power level and said second power level are transmitted, and, selectively, to said first and said second power source.

4. The system of claim 2, further including a first power source sensor for measuring a first level of available electrical power from said first power source and a second power source sensor for measuring a second level of available electrical power from said second power source, said first and second power source sensors electrically connecting to said electronic controller, to which said first power level and said second power level are transmitted, and, respectively, to said first and second power sources.

5. The system of claim 4, wherein said electronic controller generates a warning for a user when said first power level is below a first predetermined power level required to provide sufficient electrical power to said starting power consumer for starting the engine.

6. The system of claim 5, wherein said electronic controller generates a warning for a user when said second power level is below a second predetermined power level required to provide sufficient electrical power to the consumers, including the electrical power generating means and the electrical circuit.

7. The system of claim 6, further including an engine sensor connecting to the engine and electrically connecting to said electronic controller for detecting when the engine is running.

8. The system of claim 7, wherein said engine sensor is an oil pressure sensor for detecting a pressure level of engine oil, said pressure level being larger than a predetermined pressure level when the engine is running.

9. The system of claim 7, wherein said electronic controller closes said first switch when the engine is running and said first power level is below a third predetermined power level required to indicate said first power source is at full electrical capacity, thereby allowing the electrical power generating means to recharge said first power source.

10. The system of claim 9, wherein said electronic controller opens said first switch when said first power level is larger or equal than said third predetermined power level, thereby indicating said first power source has been recharged at full electrical capacity.

11. The system of claim 7, wherein said electronic controller ensures that said first switch is opened when the engine is being turned off.

12. The system of claim 7, wherein said electronic controller generates a warning for a user and opens said second switch when the engine is running and said second power level remains below said second predetermined power level after being recharged by the electrical power generating means for a first predetermined amount of time, thereby indicating that the second power source needs to be replaced.

13. The system of claim 7, wherein, when said engine is not running and said second power level is below the second predetermined power level, said electronic controller generates a warning for a user to start the engine to allow recharge of the second power source.

14. The system of claim 13, wherein said electronic controller subsequently opens said second switch to disconnect the second power source from the electrical circuit until the engine is restarted.

15. The system of claim 1, wherein said first and second switches are generally opened and closed, respectively, during normal operation of the vehicle.

16. The system of claim 2, further including at least one sensor for sensing information about at least one of the vehicle and consumers thereof and a display connected to said electronic controller for visually displaying information collected by said at least one sensor.

17. The system of claim 2, further including a container for housing said electronic controller, said container being locatable in an interior area of the vehicle adjacent a driver seat thereof.

18. The system of claim 2, wherein said electronic controller is programmable by a user.

19. The system of claim 6, wherein said electronic controller includes a memory for selectively storing at least one of said first and second predetermined power levels therein.

20. The system of claim 1, further including a third switch for selectively connecting the second power source to the starting power consumer to provide power thereto when said third switch is closed, whereby the third switch allows the second power source to bypass the first power source so as to allow starting of the engine therewith.

21. The system of claim 20, further including an electronic controller independently and operatively connecting to said first, second and third switches, whereby said electronic controller independently controls operation of both said first and second switches to selectively isolate respective said first and second power sources from the electrical circuit and operation of said third switch to selectively connect said second power source from said starting power consumer.

22. The system of claim 21, further including a first power source sensor for measuring a first level of available electrical power from said first power source and a second power source sensor for measuring a second level of available electrical power from said second power source, said first and second power source sensors electrically connecting to said electronic controller, to which said first power level and said second power level are transmitted, and, respectively, to said first and second power sources.

23. The system of claim 22, wherein, before the engine is started, said electronic controller closes said third switch to allow said second power source to power said starting power consumer to allow starting the engine when said first power level is below a first predetermined power level required to provide sufficient electrical power to said starting power consumer for starting the engine.

24. The system of claim 20, wherein said first, second and third switches are generally opened, closed and opened, respectively, during normal operation of the vehicle.

25. A method for isolating a first power source of a vehicle, connected to a starting power consumer for starting an engine of the vehicle, from a second power source of the vehicle, the vehicle having consumers, including an electrical power generating means and an electrical circuit for distributing electrical power among the consumers, said method comprising:
  connecting said first power source to the electrical circuit through a first switch; and
  connecting said second power source to the electrical circuit through a second switch; thereby allowing selective isolation of said first and second power sources from the electrical circuit through independent operative control of said first and second switches, respectively.

26. The method of claim 25, wherein the vehicle includes an electronic controller, said method further including:
  connecting said first and second switches to the electronic controller for selective and independent control thereof by the controller.

27. The method of claim 25, further including:
  connecting said second power source to the starting power consumer through a third switch; thereby allowing the second power source to bypass the first power source so as to allow starting of the engine therewith when the first power source is below a predetermined power level required to provide sufficient electrical power to said starting power consumer for starting the engine.

28. The method of claim 27, wherein the vehicle includes an electronic controller, said method further including:
  connecting said first, second and third switches to the electronic controller for selective and independent control thereof by the controller.

* * * * *